United States Patent
Ciccone (10) Patent No.: US 9,159,000 B1
(45) Date of Patent: Oct. 13, 2015

(54) DEVICE AND METHOD FOR PRODUCING A SECURITY MARK ON A SHEET OF PAPER

(71) Applicant: AVELINO LLC, Miami, FL (US)

(72) Inventor: Nicolas Tadeo Ciccone, Buenos Aires (AR)

(73) Assignee: AVELINO LLC, Miami, FL (US)

( * ) Notice: Subject to any disclaimer, the term of this patent is extended or adjusted under 35 U.S.C. 154(b) by 0 days.

(21) Appl. No.: 14/279,564

(22) Filed: May 16, 2014

(51) Int. Cl.
*H04N 1/40* (2006.01)
*G06K 15/02* (2006.01)

(52) U.S. Cl.
CPC ...................................... *G06K 15/02* (2013.01)

(58) Field of Classification Search
CPC ............ B41M 3/14; B41M 5/24; B41M 3/16; B41M 1/10; B41M 5/508; B41M 1/04; B41M 1/06
USPC ............. 358/3.28, 3.31–3.32, 1.12, 498, 296, 358/1.9, 2.1
See application file for complete search history.

(56) References Cited

U.S. PATENT DOCUMENTS 5,380,695 A * 1/1995 Chiang et al. ................. 503/227
6,110,022 A 8/2000 Ciccone et al.
2006/0249951 A1 * 11/2006 Cruikshank et al. ............ 283/92
2007/0225402 A1 * 9/2007 Choi et al. ..................... 523/160
2010/0307376 A1 * 12/2010 Aboutanos et al. ........ 106/31.15

FOREIGN PATENT DOCUMENTS

CN 101475764 A * 7/2009
DE 3 718 452 A1 1/1988

* cited by examiner

*Primary Examiner* — Thomas D Lee
*Assistant Examiner* — Stephen M Brinich
(74) *Attorney, Agent, or Firm* — Norris McLaughlin & Marcus P.A.

(57) ABSTRACT

A device for making security marks by means of a plurality of simultaneously backing and printing dies, each with a pre-designed image. The device makes it possible to subject a sheet of paper to a novelty simultaneous abrasion and printing method of a security mark using the dies previously and smoothly inked by means of inking rollers with either one or more inks not visible to the naked eye, but revealable by one or more temporarily applicable revealing stimuli, wherein the security mark shows as authentication evidence a pre-designed image invisible to the naked eye, but which becomes visible in many different ways, and at least one second form of verification under a revealing stimulus, wherein all forms in which the images are revealed on the paper have an absolute matching location because they are produced simultaneously and by the same backing and printing die.

9 Claims, 5 Drawing Sheets

DEVICE AND METHOD FOR PRODUCING A SECURITY MARK ON A SHEET OF PAPER

TECHNICAL FIELD

The present disclosure is related to a device comprising a special mounting of simultaneous backing and printing dies combined with a peripheral grinding wheel and inking rollers, which allows to obtain a new security mark applicable on a piece of paper, sheet of paper or the like. More specifically, in some embodiments, the disclosure relates to a device allowing to carry out a new method for producing multiple security marks on a piece of paper, sheet of paper, document and/or the like, preferably on a document of value.

In addition, the present invention defines a method for making a security mark, more preferably a type of security mark, wherein the new type of marking brings significant authentication and anti-counterfeiting advantages as it enables a multiple visual verification, at least a first verification by holding a pre-designed image to the light and additionally at least an additional verification by temporarily revealing the same pre-designed image by applying a revealing means such as for example ultraviolet light, polarized light, infrared light, heat and/or the like and/or a combination of all the above, with an absolute position matching of both verification conditions. Also, the inventor provides a document of value with this particular security mark on it.

BACKGROUND ART

The present disclosure relates to a device which allows to obtain at least a double visual validation security mark, that is, revealed when held against the light, and by the incidence or application of a means to temporarily reveal the security mark, as for example, ultraviolet light, polarized light, infrared light, heat, and/or other revealing means. Said security mark is applicable on the most varied layered substrates such as cotton-, flax-, cellulose-produced paper, a combination of the above or of any other type. This type of device may be used for an industrial application according to the method disclosed in this same document in order to produce the security marks that are applicable and which are difficult to reproduce by an unauthorized person so that they serve as a security measure against counterfeiting, allowing a person to authenticate the origin of the paper received. A clear object of incorporating this type of security marks is to prevent counterfeiting of certificates, official documents, documents of value, e.g., banknotes, postage stamps, passports, tickets, bonds, certificates, and the like. In response to the continuing evolution of developments in this field of art, bellow there is a brief overview or reference framework that is considered relevant to demonstrate the advantages obtained by the present invention.

Among the many and ever-increasing security measures designed to prevent counterfeiting of certificates, official documents, passports, tickets, banknotes, documents of value, and the like, it is well known the continuing, widespread and reliable use of the so-called watermarks. Said watermarks are basically an image formed by a subtle difference of thicknesses and/or densities in a sheet of paper obtained during paper manufacturing process, more specifically when the paper pulp that is still wet is pressed against a roller having a relief or depression with the image to be incorporated on the paper as a watermark.

A watermark becomes visible when said type of paper is held to the light. It is noteworthy that for the purposes of the present invention when referring to paper, a person skilled in the art understands that this is for the purposes of descriptive clarity and simplicity, and said term "paper(s)" shall include herein any type of layered substrate, such as any sheet of paper, which for practical purposes, and in order to obtain a high mechanical strength, is obtained with cotton or flax fibers, or combinations thereof. At present, the main interest of using said watermark is to demonstrate the authenticity of the paper or print origin. Basically, a watermark, when applied to documents and certificates of value, especially when applied to documents of value, such as those mentioned above and equivalent embodiments, it prevents obtaining counterfeited documents by photocopying, scanning and printing them. This makes it a durable, easy to verify and hard to counterfeit security feature, which may contain an image such as a very simple drawing, sign, symbol or otherwise incorporate a highly detailed image displaying multiple tones when viewed against the light.

When this security technology is applied to documents of value, the image displayed by the watermark usually varies according to the type of paper document in which it will be applied, whether a certificate, banknote, bond, etc. Usually, the watermark image is related to the rest of the figures, decorations, symbols and images that are obvious on casual inspection.

While this particular and mutual relationship between the image of the visible printing of the document of value and the watermark image (only visible when held to the light) represents a very efficient security feature against counterfeiting, from the practical point of view during the manufacture of said certificates, official documents, documents of value such as bonds, passports, tickets, banknotes and the like, their use requires special care since each sheet of paper must be properly combined with the watermark which comes from the manufacturer with the subsequent permanent and usually two-sided printing visible with traditional ink, to match each watermark image with the correct traditional visible printing.

A person skilled in the art, for example, engaged in manufacturing documents of value and/or the like, knows that they not always have enough sheets of paper with a particular watermark design for a production batch, and at the same time they can have an idle number of sheets of paper with another watermark design that is not in use for some time, or even that has become obsolete.

In response to said problem, the inventor of the present invention has proposed in the past a method to produce a sheet of paper with a positionable security stamp. Said positionable stamp can be seen in U.S. Pat. No. DE 3,718,452 of this same inventor, wherein it has been proposed to obtain an optical effect similar to that of a watermark, but with the advantage that the stamp can be produced in a sheet of paper already manufactured and therefore avoiding the logistics and storage limitations mentioned above. Therefore, said proposal offers a significant advantage over its background since it allows to incorporate security marks which can be seen when held to the light through a new method applicable in the press itself which then will continue with the rest of the visible printing of the document of value. Thus, the press itself is capable of providing as many authenticated sheets of paper with this special marking as needed, wherein said marked sheets of paper then comprise the specific security stamp of each document of value, document and/or the like.

In short, the method proposed in said disclosure, is performed based on the use of a mold with projections in relief corresponding to a previously engraved design or drawing in said mold; the engraving mold is mounted on a carrier so as to be able to put the sheet of paper on the mold such that thus mounted the sheet of paper is subjected to the pressure of a roller and thus causing the deformation of the sheet of paper with recesses and projections similar to those of the die where it rests. Eventually, was proposed to reduce the thickness of the ridges of the paper by means of a rotary grinding wheel, which partly wears out paper thickness. Said proposal can be seen in the disclosure of said U.S. Pat. No. DE 3,718,452, which is herein incorporated by reference in its entirety. However, the invention continues obtaining as a result a mere emulation of a watermark only visible when held to the light, which can even coexist with other preexisting watermarks, but which does not add any further feature for authentication of documents of value.

Further developments of the same inventor of the present invention, take into account the need to solve some problems such as avoiding paper shifting when the paper is rolled in the stamping cylinder, as well as preventing the formation of undesirable creases in the paper and the consequent paper breakage, among other things which are reflected in U.S. Pat. No. 6,110,022, of the same inventor; wherein and all which is therein disclosed is herein incorporated by reference in its entirety. In said disclosure the inventor focuses on incorporating paper adjustment means on the surface of the peripheral wall of the support cylinder comprised in a pneumatic circuit and arranged adjacent to the area between the support cylinder and the grinding wheel; and on incorporating brushes (acting as paper-pressing means) projecting against the peripheral wall of the cylinder. Thus, the invention proposes an obvious improvement of the method for fixing the paper on the roll; however, the type of security mark obtained remains the same type known in the prior U.S. Pat. No. DE 3,718,452, not bringing substantial improvements on the antifraud qualities of the security marks obtained.

It can be seen therefore that successive proposals have allowed to avoid the need to purchase the specially marked sheet of paper from the manufacturer capable of incorporate a watermark at the time of production of the same from the pulp, but they have not provided any advances regarding devices and methods directed to obtain more complex security features in order to obtaining a more secure authentication. It is understandable, therefore, the continuing need for new devices and methods for obtaining new types of security marks applicable to documents of value, and the like. Security marks increasingly demand high standards of antifraud security and the capacity of coexisting with other preexisting security measures or being subsequently inserted into the sheet of paper, among which there are holographic bands, fluorescent fibers, transparent windows, and even watermarks. A person skilled in the art knows that incorporating new antifraud security elements in a document of value and/or the like, is not an easy task considering that each security element incorporated must be able to be applied with absolute precision on the sheet of paper (substrate), be compatible with other security elements already present and stand the test of time by the constant manipulation and without adding significant costs.

Based on the above, and as will be shown in detail below in the section directed to the detailed description, the present invention has offered significant advantages over all the prior art known, since it proposes a new device for producing a suitable security mark for obtaining a new and accurate abrasive gravure printing of a pre-designed image on the front (obverse) of the substrate and a simultaneous printing of the same pre-designed image on the back (reverse) of the same substrate.

While for purposes of clarity the invention will be better described with reference to a sheet of paper and obtaining documents of value, the description, when made in singular regarding each element extends also to the description in plural of a plurality of said elements and the particular description referred to a document of value is equivalent and can be applied to certificates, official documents, passports, banknotes, tickets, bonds, and the like without any limitation, formed on a sheet of paper with the extent of the definition given above.

BRIEF DESCRIPTION OF THE INVENTION

In short, the object of the present invention is to provide a device that can be incorporated seamlessly in an industrial production plant, more specifically as a standalone unit or in a document processing and printing equipment, wherein the proposed device mainly consists of a plurality of components interacting in a new way to allow incorporating a new distinctive security mark on the layered substrate of a sheet of paper.

It is therefore the object of the present invention to obtain a security mark applicable on a sheet of paper, providing a new way of authenticating the origin of the product manufactured with said sheet of paper, comprising a first validation by watching a preferably multi-tone pre-designed image when held against the light, and at least one second validation by applying a temporary revealing means such as ultraviolet light, infrared light, polarized light, heat, and other equivalent alternatives from the standpoint of the present invention, allowing to see the same pre-designed image that can been seen by the viewer with a fluorescent, single-tone or multitone color, while the stimulation received by the temporary revealing means lasts or persists.

The present invention proposes the incorporation of at least one backing and printing die comprising a free face with a pre-designed image, wherein said backing and printing die is mounted on the perimeter of a main rotary cylinder. This simultaneous backing and printing die is suitable for backing said sheet of paper against said grinding wheel at a distance of approach which is sufficient to wear out the front of said paper without passing through it and matching said pre-designed image, and is suitable for simultaneously printing of said pre-designed image with temporarily revealing ink under stimulation on the reverse of said sheet of paper.

It is therefore a main object of the present invention to provide an inking roller train, wherein at least one of said inking rollers, i.e., the applicator roller (which may be one or more applicator rollers) is positioned so as to contact said free face with a pre-designed image of the simultaneous backing and printing die; therefore, one object of the present invention is to provide at least one first inking roller train comprising at least one roller for the application of said temporarily revealing ink under the stimulation, for example of ultraviolet light, heat, infrared light, polarized light, etc. and it is positioned so as to contact said free face with a pre-designed image of the simultaneous backing and printing die, wherein said applicator roller is designed as a roller for the application of said ink so as to have an elastically yielding periphery, applying thus effectively and smoothly the ink to be subsequently applied simultaneously with the wearing down by abrasion of the pre-designed image.

It is therefore an object of the present invention to provide a device and method for simultaneously grinding and printing a security mark invisible to the naked eye but which may manifest with one or more colors of temporarily revealable ink under the stimulation of some revealing means, in said case it will be possible to provide in the device one or more inking roller trains comprising at least one first inking roller train for applying a first revealing ink by temporary stimulation to present a first visible single-tone or multi-tone manifestation, e.g., manifest a first fluorescent color when the ink is a transparent ink but visible under ultraviolet light stimulation, and optionally a second inking roller train, for applying a second revealable ink by temporary stimulation, which can be obtained, for example, with the application of a second ink invisible to the naked eye but revealable in a second color or optical effect by means of the application of ultraviolet light, heat, polarized light, infrared light, among other possibilities, being said inks applicable on the free face of the simultaneous backing and printing die, and so on with three or more applicator rollers in three or more inking roller trains. Of course, other combinations of inks and revealing means by direct or indirect stimulation may be applicable, since the invention allows to apply special inks, whatever the way they are subsequently revealed.

It is then an object of the present invention to provide a method for making security marks positionable on any sheet of paper or substrate, carried out by means of the device herein described and illustrated, comprising the following steps: a) mount on said perimeter of said main backing rotary cylinder at least one simultaneous backing and printing die comprising the free face with the pre-designed image, i.e., the image to be applied on the paper as a security mark; b) ink the free face with the pre-designed image of said at least one simultaneous backing and printing die by means of at least the first inking applicator roller of the first inking roller train; c) transfer the sheet of paper towards the main rotary cylinder, retaining said sheet of paper resting on at least said one simultaneous backing and printing die with its free face already inked, wherein the retention of said sheet of paper is obtained with said retention means; and d) subject said sheet of paper to the abrasion of the rotating grinding wheel so that the distance of approach causes wear on the front of said paper without passing through it matching said pre-designed image, and simultaneously print said pre-designed image with said ink on the reverse of said sheet of paper, wherein the ink is invisible to the naked eye and is temporarily revealable when subjected to a temporarily revealing means such as ultraviolet light, infrared light, polarized light, heat and the like.

Therefore, the object of the present invention is to provide a document of value characterized in that it includes a security mark that has been incorporated into said document of value by means of the method herein proposed and conveniently by means of the device herein described, wherein said security mark is engraved on the front of the substrate of said document of value and said security mark is printed with ink invisible to the naked eye but that can be temporarily and repetitively revealed at will when stimulated with, for example, ultraviolet light, polarized radiation, infrared radiation or heat on the back, among other forms of revealing it.

It will be understood that the foregoing brief description, as well as the following detailed description and the preferred embodiments described with reference to the figures attached hereto are intended to provide an overview or reference framework for understanding the nature and character of the invention and should not be taken in any way as limiting thereof. It shall also be understood that other additional advantages and features of the present disclosure will become obvious to those persons skilled in the field of the art based on reading the following detailed description.

BRIEF DESCRIPTION OF THE FIGURES

FIGS. 5a-5c represent the results from the interaction obtained between the paper (substrate) and this special inked die and which at the same time supports the paper during the process of incorporating the engraved security mark that can be visually revealed (e.g., by means of ultraviolet light to show its fluorescence). Said

FIG. 6 shows the incorporation of an additional inking roller train.

DETAILED DESCRIPTION OF THE INVENTION

A detailed reference will be made below of the embodiments of the present invention; more specifically, the invention will be described, for purposes of clarity, based on the preferred exemplary embodiments illustrated in the attached figures. Each example provided herein shall only be taken as a preferred example of how to reduce to practice the present invention, but they are not limitations thereof. In effect, based on the teachings arising from the present description and from the figures attached hereto, a person skilled in the art may find apparent how to carry out a variety of modifications and adaptations on the object of protection herein proposed, and without however departing from the scope of the present invention.

In short, the present invention provides a device with the ability to apply a security mark on a sheet of paper, wherein said security mark is obtained by the action of the simultaneous abrasion and printing by specially inked dies, which support the sheet of paper against a grinding wheel. This device can be reduced to practice as a standalone unit or a modular unit and/or an integral unit of an installation or equipment for the production of security documents.

Device for Producing a Security Mark on a Sheet of Paper

Figure 1:
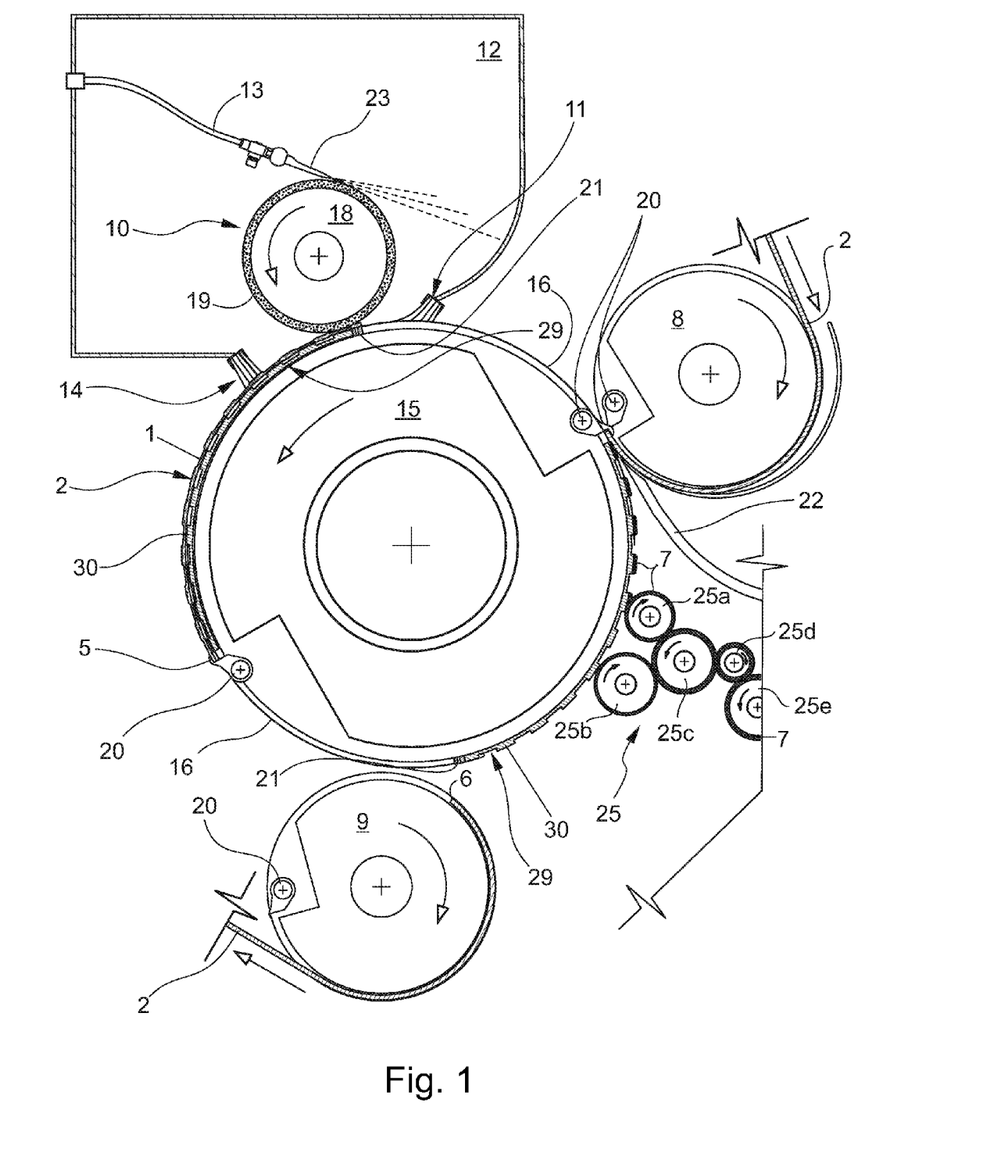
FIG. 1 illustrates a first preferred embodiment of the device for producing a security mark with an at least double form of verification applicable to a sheet of paper by way of non-limiting example of the present invention; the device is shown in a side view and with some of its parts in a cross section to better understand the interaction of the components, also some elements like brushes and ink thicknesses have been emphasized in order to be seen by the viewer.

As best illustrated in FIG. 1 as a general reference, it has been proposed a first preferred embodiment of the several components comprising the device of the present invention and that therefore allows to carry out the new and efficient method of incorporating a safety marking on a suitable substrate. For the practical purposes of the present invention, said substrate (2) referred to herein for purposes of clarity simply as a "piece of paper", and such as will be understood by a person skilled in the art, may be a layered material such as cotton, flax, fibers and/or materials derived from paper pulp, cellulose, polymers, mixtures thereof and/or the like, so as to have a sheet of paper sufficiently resistant for its intended purpose; namely, the substrate used, which will be hereinafter referred interchangeably as a sheet of paper, paper and/or substrate, preferably is of the type used in the manufacture of security or authenticated documents, and even most preferably in everyday heavy use elements such as documents of value, without this being a limitation for the purposes of applying the present invention.

Said FIG. 1 shows the device of the present invention which comprises a main rotary cylinder (15) for backing said sheet of paper (2) during the operative or productive step of the method herein proposed; more specifically, said main rotary cylinder (15) is used to receive the sheet of paper (2), from a take-in roller (8) transport said sheet of paper (2) during all the process of incorporation of the security mark (1) according to the present invention, and then deliver said piece of paper (2) to a take-out roller (9), either for further processing or simply for storing said sheets of paper already marked.

Namely, although the present description may refer to a security mark (1) or to a plurality of security marks, for the purposes of the present invention, its mention is indistinct and equivalent, as it is obvious for a person skilled in the art that the production of security marks (1) positionable on a sheet of paper (2), is carried out preferably using a rotary cylinder similar to the one used herein to obtain a continuous and efficient method, so that for reasons of industrial application and manufacturing, it is clear that it will be preferred to produce multiple markings during each revolution of the cylinder.

Said main rotary cylinder (15), preferably has a diameter allowing to apply to the sheet of paper (2) a peripheral path which is twice the peripheral path of said take-in roller (8) or of said take-out roller (9). Later, based on the present description, the derivations and advantages of the above will become apparent to allow the required inking that will be described in detail in relation to the further procedure. Also, although, for purposes of identification of the present invention said component has been mentioned as "main rotary cylinder" supporting the sheet of paper, the same can be identified by a person skilled in this field of the art with different names, such as roller, drum, or just cylinder, among others because it is a mere nomenclature to identify said main cylinder (15).

Figure 4:
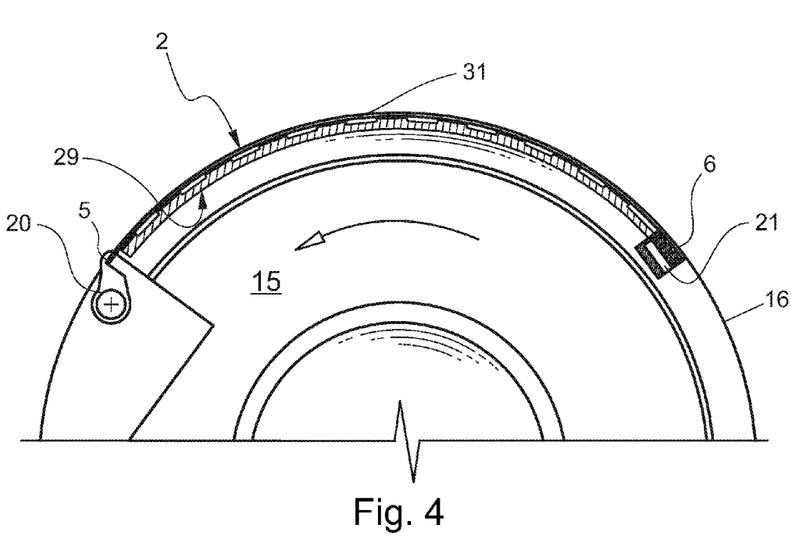
FIG. 4 illustrates an enlarged side view of part of the main rotary cylinder backing the sheet of paper; which has been isolated from the rest of the components for the purpose of clarity, to better illustrate the mode of retention of the sheet of paper on the cylinder and the leaning of said sheet of paper on the already inked dies.

In FIG. 1, the sheet of paper (2) is transported clockwise (top right in FIG. 1) from the periphery of the take-in cylinder (8), and then towards the periphery of the main rotary cylinder (15) where it adopts a counterclockwise rotation, and finally it is delivered through transfer to the take-out roller (9), again clockwise (bottom left in FIG. 1). This successive transfer: "roller (8), cylinder (15) and roller (9)" is obtained through the interaction of a plurality of front retention means (20), consisting basically of clamps or clips, preferably rotating or pivoting, which hold the sheet of paper (2) from the front end or leading edge (5), which is complemented with a suction means (21), which sucks up the rear end or edge (6) obtaining a tensioning of the paper on the periphery (16) of the main rotary cylinder (15), which is best illustrated in FIG. 4. The pivoting clamps (20), take the leading edge (5) of the sheet of paper (2) from the previous roller, they hold it during its transportation on each roller, and delivered it to the next roller (when it interacts with the adjoining roller or cylinder) to be taken by the next set of clamps (20). The back suction provided by suction nozzles, perforations or grids (21), for practical purposes also acts as a retention means. As can be seen, said retention means (21) by suction/aspiration, generally act under the effect and in conjunction with said front clamps (20). Said preferred embodiments, described and illustrated above, have proven to be efficient and the most suitable for their inclusion in the main rotary cylinder (15) backing said sheet of paper and to act as effective retention means (20, 21) of said sheet of paper.

The device of the present invention incorporates a rotary grinding wheel (10) adjacent to the perimeter of said main backing rotary cylinder (15) with an adjustable distance of approach (g) (See FIG. 3) regarding said main backing rotary cylinder (15). It is worth mentioning that said distance (g) of approach, for purposes of the present invention is intended to be adjusted so as to be able to make an interference in the thickness of the paper (2) during its travel thus producing a controlled wear out of the paper by abrasion as will be described in detail below. Therefore, the rotary grinding wheel (10) will wear the front (3) of said paper (2), without actually passing through it to produce a slight difference in the thickness of the paper in the areas to be engraved with the desired image so as to simulate the effect of a watermark in the sheet of paper (2). According to prior art practices, among other matters described therein, the protruding parts or the more protruding parts of the paper that have been preformed with an resilient cylinder must be worn out by abrasion. This process, once calibrated, allows to obtain engraved designs with similar visual effects to those of the watermarks and with which they can coexist without any problem; however, to ensure said calibration and minimize the chances of failure, as is clear from the documents disclosed in the prior art, it was necessary to incorporate in due time some comber brushes and pneumatic circuits to act as a means of pressure of the paper against the cylinder as an innovation to secure the position of the paper against the engraving dies.

However, at present, the type of security mark (1) such as was proposed in the patents cited in the prior art remains being an emulation of the effect "held to the light" of the already known watermark, so it provides no new quality as a security feature against fraud. It is therefore that the present invention is substantially distinctive over the prior art because it allows for a new and more complex security mark, wherein this new security mark (1) comprises an engraved pre-designed image (by producing bas-reliefs, slots, grooves or valleys) on the front/obverse of the sheet of paper and the same pre-designed image printed on the reverse (in absolute matching with the engraved pre-designed image) with an ink not visible to the naked eye, but temporarily revealable when subjected to the appropriate means of stimulation or revealing (e.g., preferably a temporarily revealable ink under stimulation with ultraviolet light during the time the ultraviolet light is incident on said revealable ink) and without affecting the invisibility of the engraved marking to the naked eye (see FIG. 5a for the representation of this invisibility in the area indicated by a dotted line). This way it is possible to obtain a security mark which combines at least two forms of authentication easily verifiable by the user; i.e., in a way of verification it is possible to reveal the pre-designed image of the security mark when viewed against the light (see FIG. 5b for the engraved image on the obverse) and in another form of verification it is possible to reveal the same pre-designed image of the security mark by exposing the paper to a revealing means (R), for example, ultraviolet light, polarized light, infrared radiation and/or heat, according to the revealable ink (7) used (see FIG. 5c for the printed image on the reverse). There is not the slightest possibility of mismatch of the different markings revealed by the various revealing modes, as will be seen below, they are surprisingly produced simultaneously by the same simultaneous backing and printing die. It should be noted that the revealing mode is not a limitation, since the present invention is intended to apply the revealing ink fully matching the markings and simultaneously on the paper at the time of making the engraved marking by abrasion, therefore the type of ink, although it will be invisible to the naked eye, can be subsequently revealed at least for the duration of the stimulus by a variety of stimuli or temporary revealing means, even combinable, being therefore within the scope of the present invention, all kinds of temporarily revealable inks, wherein the term temporarily, and as will be well understood by a person skilled in the prior art refers to that said revealing marking can be reproduced again and again, as often as desired, during the time the revealing stimulus is applied, for example, if the ink was transparent and fluorescent, the marking will become visible with a fluorescent color when it is enlighten with ultraviolet light, and similarly applicable to other forms of visualization with the other revealing means and inks used.

Figures 5A, 5B, 5C:
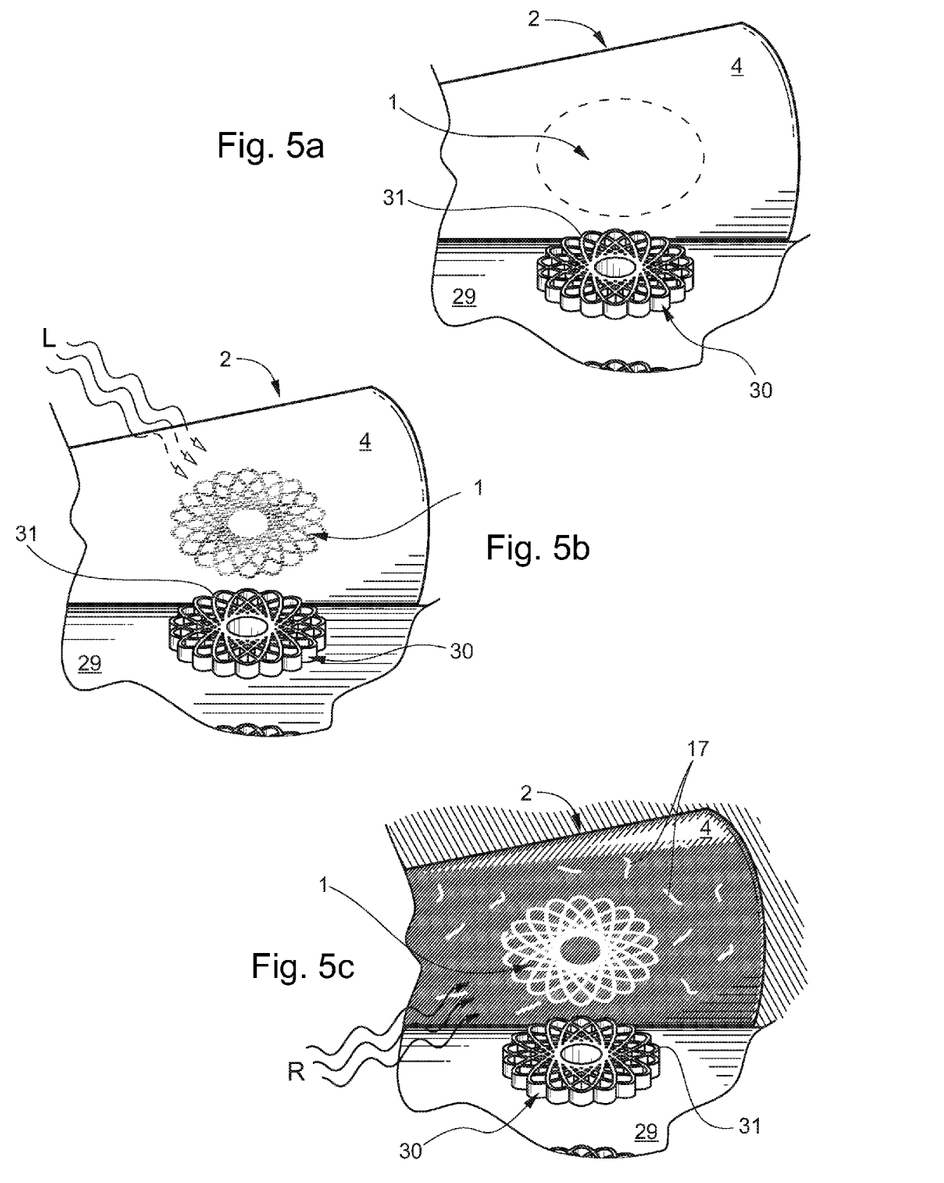
FIG. 5a shows the paper raised regarding the die, without having applied any backlight or revealing stimulus on the same (uniform ambient light), for this reason it is not possible to see any type of marking (1) in the same, although the same has already been applied.
FIG. 5b represents the paper illuminated with visible light (L) from behind, bringing out the engraved marking held to the light as dark and light tones; and finally
FIG. 5c illustrates the same sheet of paper of the two examples above, subjected to a stimulation means (R) for temporarily revealing the revealable ink, such as ultraviolet light, polarized light, infrared radiation and/or heat. The fluorescent fibers are also shown for illustrative purposes only; these fibers would illuminate in combination when the stimulation means for temporarily revealing the ink selected matches the ultraviolet light.

As mentioned above, the present invention proposes the incorporation of one or more simultaneous backing and printing dies (30), illustrated only as an example with a generic image (31) on the free face of the die in FIGS. 5a-5c. Said simultaneous backing and printing dies (30) are mounted on the periphery (16) of said main rotary cylinder (15) for backing the sheet of paper (2) and are intended to come into contact with the reverse (4) of said sheet of paper (2), as best illustrated in FIGS. 1, 3, 4 and 6. Said dies can be reduced to practice in several ways, namely; individually manufactured and mounted on multiple retention housings provided in the main rotary cylinder itself (15), previously mounted on a supporting plate (29) to then be placed on the periphery of the main rotary cylinder (15), and even manufactured on the main rotary cylinder itself. It is advisable to allow the possibility to insert and remove safely the simultaneous backing and printing dies (30) for replacing and/or repairing them as it is the most convenient way to reduce to practice the same. Said dies are positioned conveniently on the main rotary cylinder (15) so as to allow the production of security marks (1) positionable on a sheet of paper (2).

As examples for the purposes of the present invention, and as best illustrated in FIG. 1, two supporting plates (29) are being exemplified mounted in diametrical opposition comprising dies in relieve suitable for inking their superficial faces (31), i.e., simultaneous backing and printing dies (30) incorporated in the plates; which are properly distributed as to obtain a plurality of security marks (1) on the substrate (2) of interest in order to obtain the security mark revealed to the light and also temporarily revealable under certain appropriate means of stimulation (for example, a non visible ink with natural light but that is fluorescent, may be revealed with a fluorescent color under temporary stimulation with ultraviolet light). Namely, the material of the plate and/or of the relieves thereof (dies strictly speaking) may be a single metal material, a combination of metals, chemically, thermally or superficially treated, compound or not, according to a mere choice of design; also it is possible to use any combination of materials and assemblies of said dies, provided said simultaneous backing and printing dies (30) are suitable, i.e., have the physical capacity to produce the necessary pressure of said sheet of paper (2) against said grinding wheel (10) which is sufficient to wear out the front (3) of said paper (2) without passing through it and matching the die image (31) and at the same time that the die has the capacity to print said image with revealing ink (7) on the reverse of said sheet of paper (4). As a person skilled in the art will understand, although for practical purposes and preferably there are illustrations of a plurality of simultaneous backing and printing dies, of course, it is sufficient to carry out the present invention, to provide at least one simultaneously backing and printing die (30) which is mounted on said perimeter (16) of said main backing rotary cylinder (15).

It should be noted that for the purposes of the present invention, it is a condition, that the free face (31) with the pre-designed image of the simultaneously backing and printing die (30), is suitable for being inked, i.e., receive an ink layer, total or partial, on its exposed face, for the case of the present invention, an ink invisible to the naked eye (but visible when revealed with proper stimulation, for example, ultraviolet light, polarized light, infrared radiation and/or heat, among other options, in order to keep the translucent quality of the image which is revealed only to the light, and then to be able to transfer said ink accurately to the substrate (2), i.e., to the sheet of paper.

Figure 2:
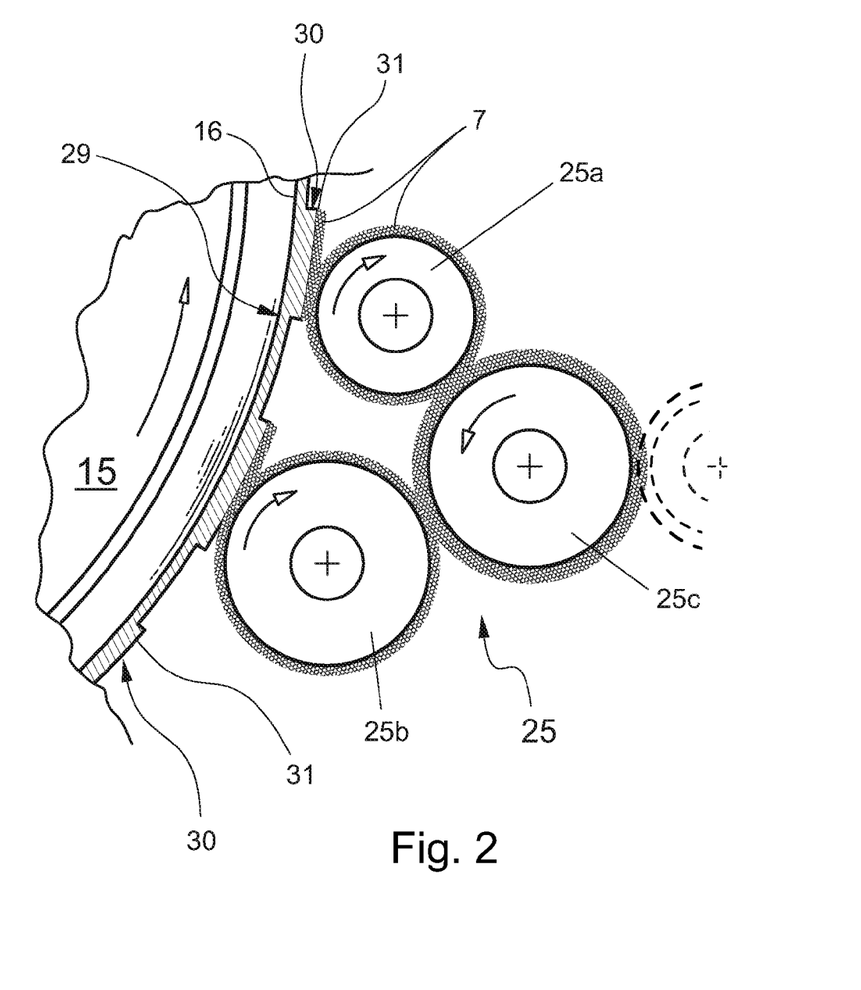
FIG. 2 illustrates in a side view an enlargement of the area of contact between the simultaneous backing and printing dies with the inking rollers, said enlargement does not necessarily correspond with the actual time of the process carried out by the device of FIG. 1.

Best illustrated in FIG. 2, the present invention obtains the advantageous inking of the simultaneous backing and printing dies (30) through an inking roller train (25), wherein at least one of said inking rollers, i.e. the inking roller (25a), specifically called "applicator roller", and more specifically a first applicator roller (25a) is positioned so as to make contact with the face (31) with the pre-designed image of the simultaneously backing and printing die (30) inking said face (31) with a preferably homogeneous layer of ink (7). Wherein preferably said ink is a temporarily revealable ink when subjected to a revealing means (R), as for example, ultraviolet light, infrared light, polarized light, heat and the like, intended to be impregnated/printed on the reverse of the substrate (2) and in perfect match to the engraved image, and simultaneously produced at the time of abrasion.

To apply the revealable ink (7) on the free face (31) with the pre-designed image of the simultaneously backing and printing die (30), the inking assembly (25) comprises a plurality of rollers (25a, 25b, 25c, etc.), which carry and condition the ink (7) from the ink fountain (not shown), passing through a plurality of transfer and distribution rollers, which adjust the appropriate thickness necessary for the ink layer, until reaching to at least one first applicator roller (25a), whose smooth surface inks the free face of the simultaneously backing and printing die (30), i.e., the free face (31) having the predetermined image to be printed. Said simultaneous backing and printing dies (30), can be manufactured so as to have a very slight difference in height in the free face itself (31) between different points of the same, so causing a slight difference in the abrasion obtained by the grinding wheel (10) resulting in a multi-tone translucent image with an even greater reproduction of detail. As shown, said free face with a pre-designed image (31) of said simultaneously backing and printing die (30) has height differences in the free face itself (31) between different points of the same and said distance of approach (g) will be lower than the distance between the perimeter of said grinding wheel and the point of lower height of said free face (31). For the purposes of the present invention said simultaneous backing and printing dies (30) may allow other names such as simultaneous backing and printing matrices, simultaneous backing and printing moulds, and other names like that, without this modifying the object to which said reference is made, provided that said simultaneously backing and printing die meets the mechanical requirements herein required in order to backing from below the sheet of paper to allow the wheel to interfere with the thickness of the paper (in different degrees of interference) wearing said paper and at the same time said backing and printing die is suitable to be perfectly inked by the inking cylinders assembly (25).

Said FIG. 2 shows an enlarged detail of the preferred configuration of said inking roller train (25) proposed in FIG. 1, wherein there is at least one of said inking rollers, i.e., a first inking applicator roller (25a), positioned so as to make contact with the face (31) having the pre-designed image of each of the simultaneous backing and printing dies (30) which pass in front of said inking train (25) on this occasion also equipped with a second applicator/inking roller (25b) that helps prevent undesired un-inked areas. It is clearly seen that the distribution roller (25c) is in contact with both applicator rollers (25a, 25b). Regarding the first applicator roller (25a) or other additional ink applicator rollers, it must be stressed that they are able to apply sufficient ink on the free face (31) of said simultaneous backing and printing dies either on the entire image or on part of the pre-designed image, as required, wherein said part of the image refers, for example, to the highest and/or most depressed areas of the printing and backing face of said special die (31), to be applied matchingly with the more or less worn areas that will occur later in the paper and/or other areas of interest to be highlighted with different revealable inks (for example, ultraviolet light, heat, polarized light, etc.) but not visible to the naked eye, among other options. Knowing that the simultaneously backing and printing die (30) has height differences in the free face itself (31) between different points thereof, the applicator roller has the capacity to accompany that difference in height of the free face itself (31), if any, this is possible by using a smooth surface applicator roller to apply the color where necessary, a elastically yielding periphery roller, i.e., an applying periphery or surface that may accompany the slight height differences in the pre-designed image of the die, in accordance with what is described and illustrated and the objectives set forth herein, clearly an elastically yielding periphery roller is a useful solution for the purposes of the present invention. FIGS. 25d, 25e, and so on show that the invention is also equipped with other ink conveyor and conditioner rollers, being the final configuration adopted a mere design choice. Other options may be seen in FIG. 6, which will be mentioned below.

It should be clarified, that ink thicknesses (7), illustrated for example in FIG. 2, (as well as in general in other figures) have been emphasized for purposes of clarity. Thus, FIG. 2, shows the application of ink (7) on the free faces (31) with the pre-designed image of each of the simultaneous backing and printing dies (30) mounted on a die plate (29). The arrows indicate the direction of rotation of each roller.

The simultaneous backing and printing dies (30) are completely exposed in their free face on the periphery (16) of the main rotary cylinder (15), as any sheet of paper already completely processed has been previously removed with the take-out roller (9), and thereby the simultaneous backing and printing dies (30) are inked and directed counterclockwise towards the retention means (20) of the main rotary cylinder (15) with the retention means (20) of the take-in roller (8), to transfer the sheet of paper (2) from the take-in transfer roller (8) towards the main backing rotary cylinder (15) thus obtaining the full backing of the sheet of paper (2) on the simultaneous backing and printing dies (30) already inked, best illustrated in FIG. 4, wherein the main rotary cylinder (15) backing the sheet of paper (2) is separately illustrated for the purpose of clarity.

Once the sheet of paper (2) is already positioned on the perimeter (16) of the main rotary cylinder (15), and having been appropriately retained with the retention means (20, 21), then the main rotary cylinder (15) for backing the sheet of paper (2) continues its counterclockwise rotation, and the sheet of paper (2) is subjected to the action of the grinding wheel (10).

Figure 3:
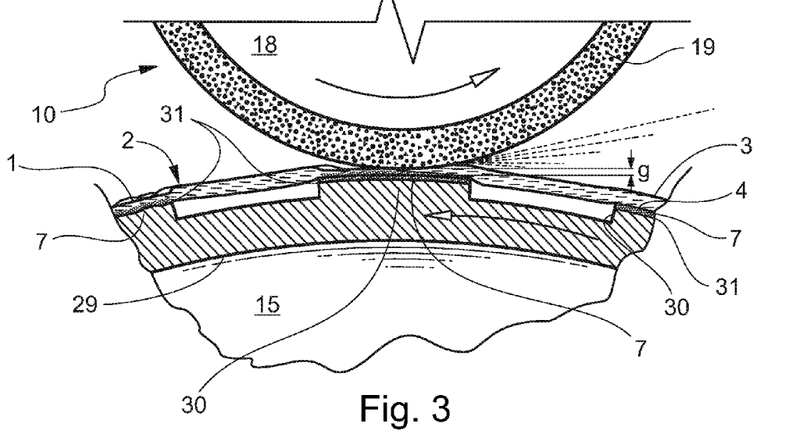
FIG. 3 illustrates an enlarged side view; with some components in cross section, showing the grinding wheel at the precise moment that it is engraving the security mark through abrasive erosion on the front and simultaneously impregnating ink on the reverse of the substrate, simultaneously printing the security mark.

FIG. 3 illustrates in enlarged detail the interaction between the abrasive periphery 19) of the grinding wheel (10), the sheet of paper (2), the ink (7) and the simultaneously backing and printing die (30). Said FIG. 3 shows three successive levels of progress (from right to left, and die by die) in the process of incorporating the security mark in the substrate (2), the simultaneously backing and printing die (30) on the right has a retained and spread layer of ink (7) on the surface of its print face (31). The ink has not yet been effectively transferred to the paper, but surprisingly, it can generate a kind of additional retention effect of the paper against the die, and thus it helps to maintain the correct positioning of the sheet of paper at the same time that it helps to decrease the formation of unwanted creases and/or uprisings of the same sheet of paper, this has been surprising and has resulted in significant improvements in the process regarding the prior art.

In the second level of progress, the simultaneously backing and printing die (30) on the center of FIG. 3, provides an adequate backing capacity from the back (4) of the paper, which is sufficient to enable that the substrate (2) be subjected to sufficient pressure against said grinding wheel (10). The distance of approach (g) of the grinding wheel (10) adjacent to the perimeter of said main backing rotary cylinder (15) is calibrated so that the pressure and/or interference of the substrate (2) with the abrasive periphery (19) is suitable as to wear out the front (3) of said paper (2) without passing through it matching the image (31) of the die having the projections or relieves, and inversely proportional to the rise of the projections or relieves in order to obtain multi-tone images when held to the light. Even more preferably the thickness of paper remaining in the valleys of the gravure is equal or greater than the thickness of penetration, embedding and/or impregnation of the ink (7) applied.

Simultaneously, at the time of grinding (i.e. while grinding), the die itself prints the same image (which is being grinding on front) with the revealable ink (7) on the reverse (4) of said sheet of paper (2). This simultaneous action is surprisingly advantageous, as the pressure exerted on the sheet of paper (2) between the simultaneously backing and printing die (30) and the abrasive periphery (19) which is rotating (towards either rotation direction, anticlockwise and/or counterclockwise) causes a surprising combination of vibration and pressure which is excellent to impregnate ink (7) very effectively on the reverse (4) of the substrate (2). As shown in the third level of progress of said FIG. 3, the simultaneously backing and printing die (30) has already transferred (impregnated or embedded) all the ink (7) into the paper, while at the same time a slight reduction of the printing face of the printing with ink has been obtained, thus obtaining a perfect match in the location and shape of the images that will be revealed or made visible through different means of verification obtaining for example a document of value with more than one way of authentication of the same pre-designed image.

Said grinding wheel (10), preferably, is actuated (driven) separately from the rest of the rollers/cylinders, usually at a tangential peripheral speed substantially greater than that of the main rotary backing cylinder (15). As mentioned above, the distance of approach (g) between the grinding wheel (10) and the backing rotary cylinder (15) is adjustable, and can progressively be adjusted, even it is possible to incorporate a variety of sensors to measure its wear and/or performance and thereby obtain a constant thickness of abrasion.

In addition, said rotary grinding wheel (10) may comprise a plurality of grinding wheels, for example, by stacking a grinding wheel next to the other (package of wheels), and said grinding wheel not necessarily must consist of a completely grinding body, since it suffices that its periphery (19) be abrasive and can therefore have a central body (18) on which to mount, for example, grinding wheels, emeries, grinding belts (for example, sandpapers), and/or any possible combination. Preferably as a design choice, said grinding wheel (10) comprises a cylindrical central body (18) and a grinding belt (19) mounted on said central body, or any other equivalent configuration for the purposes of obtaining the wear or abrasion required to carry out the security mark proposed by the present invention.

FIGS. 5a-5c show a simultaneously backing and printing die (30) displaying an exemplary pre-designed image practiced on the free face (31) in order to be incorporated into a paper (2) as security or authentication measure. FIG. 5a illustrates the simultaneously backing and printing die (30) on a die plate (29), although said dies may be placed directly onto the main rotary cylinder (15) having raised the sheet of paper (2) once completed the simultaneous grinding and printing method proposed in the present invention. Said figure represents that no marking type can be seen to the naked eye because the paper (2) is not exposed to ultraviolet light, or heat, or polarized light, or infrared light, or any other revealing means (R) of the ink and has not been held to the light either.

In FIG. 5b, a visible light (L) has been applied, such as the light of a lamp or the light of the sun, showing that the engraved security mark is made visible when held to the light with a pre-designed shaded image perceptible to the naked eye (whether, multi-tone or single-tone) as long as the action of said backlight persists, thus obtaining the desired effect of revealing it when held to the light; however, the present invention further provides an additional advantage over the prior art, which has been represented by reference in FIG. 25c, wherein the back (4) of the same paper represented above in FIGS. 25a, 25b, now illustrates by way of example the incidence of a revealing means (R) for example ultraviolet and/or infrared light radiation, and/or polarized light and/or heat radiation, on the reverse face (4), causing the security mark (1), this time, to appear under a second revealing form, showing an image revealed to the naked eye consisting of the same pre-designed image exactly in the same position (perfect match) that the pre-designed image applied simultaneously by abrasion. For this case, the pre-designed image printed with ink on the reverse (4) is visible with a revealable color or tone for the duration of said incidence of the temporary revealing means, so as to be able to have a new security measure applicable on, for example, a document of value or in general on an authenticable document. In addition to the above, and as illustrated by way of example in said FIG. 5c other security elements may coexist such as a plurality of security fibrils or threads (17) usually fluorescent (shown as they would look when illuminated by UV light), which would appear together with the security mark when the latter also has fluorescence properties, although several combinations of revealing means can be used for this new security mark.

Finally, and with reference to the first preferred exemplary embodiment of the device of the present invention in said FIG. 1, and to a second preferred exemplary embodiment of the device of the present invention in FIG. 6, a variety of complements, accessories and improvements are shown that can be consistently introduced without any problem, and which are detailed below.

Figure 6:
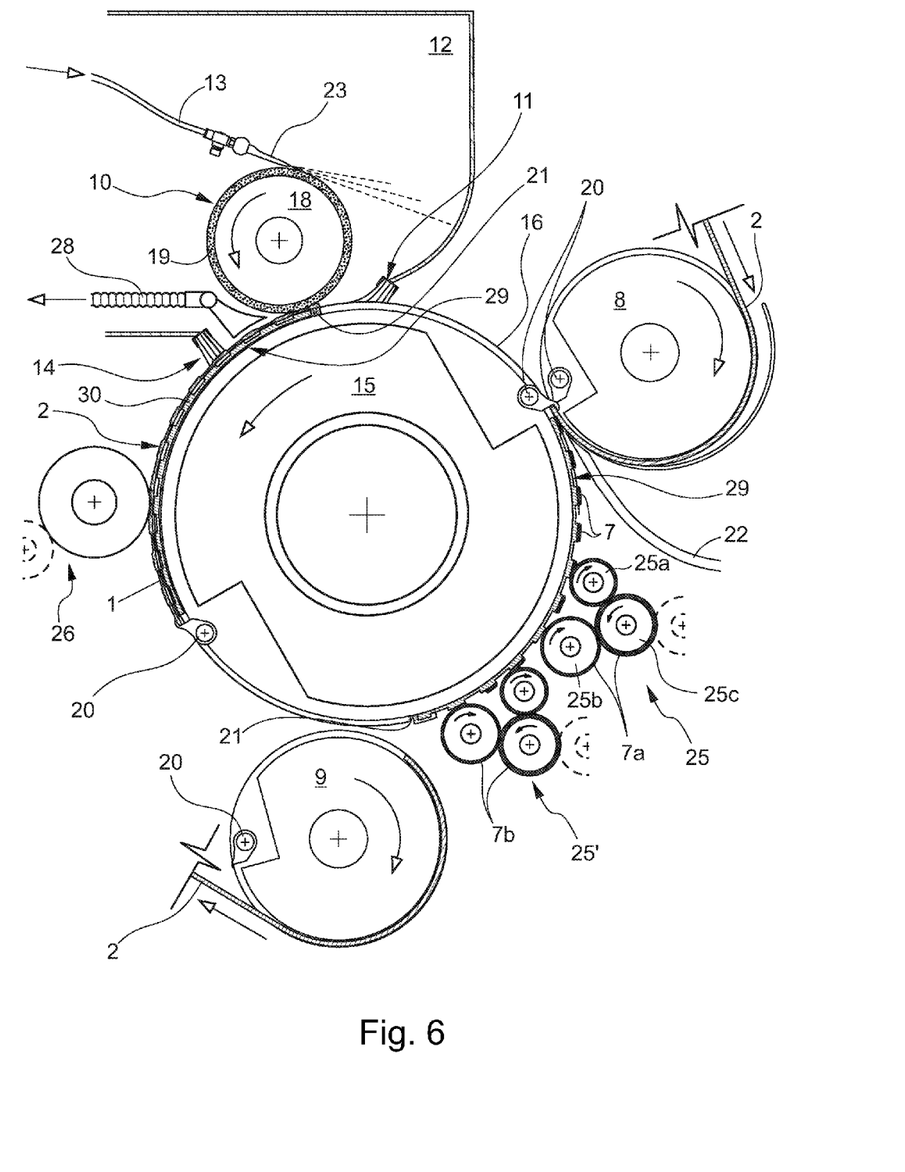
FIG. 6 illustrates a second preferred embodiment of the device for producing a security mark visible to the light and which can be seen under revealing stimulation, for example, with fluorescent ink under ultraviolet light, revealable ink by means of heat, etc. applicable to a sheet of paper by way of non-limiting example of the present invention. The device is illustrated in a side view and with some of its parts in cross section to better see the interaction of the components, also some elements such as brushes and ink thicknesses have been emphasized in order to be seen by the viewer. Unlike FIG. 1

FIG. 1 shows the incorporation of a cabinet (12), also partially illustrated in FIG. 6; the aim of said cabinet (12) is to help channel the dust produced during grinding, the same can include an outer suction cleaner (not shown) to remove continuously and/or intermittently, the dust retained inside the cabinet (12). It is also possible to incorporate one or more suction or vacuum cleaners (28), (22) within and/or outside the cabinet (12) in different positions to suck and/or blow (as required) the dirt, dust and harmful particles to carry out the method of the present invention.

Said FIGS. 1 and 6 show a comber brush (11) placed between the lower opening of the cabinet and the main rotary cylinder (15) on the face from where the sheet of paper gets into the device (2), which helps to push the paper against the cylinder (15) while isolating the interior of the exterior of the cabinet (12), further preventing the entry of unwanted elements from outside that could be carried by the upper surface of the paper (2). In addition a pressing brush (14) is incorporated, acting in a similar way, but from the outgoing face of the sheet of paper (2). Preferably, this second brush presses even more strongly than the comber brush (11) of the inlet, to achieve an even greater effect on cleaning efficiency, insulation. As described above, said grinding wheel (10) comprises a cylindrical central body (18) and a grinding belt (19) mounted on said central body, being said grinding wheel included within a cabinet (12), wherein said cabinet has a lower opening with a comber brush (11) and a pressing brush (14) causing the lower closing of said cabinet against said main rotary cylinder (15).

It is possible, and even preferred, to incorporate a blower nozzle (23) inside the cabinet (12) when it is provided, in order to clean the grinding surface of the rotating grinding wheel (10), i.e., its abrasive periphery. This is possible when directing the vent jet directly towards the peripheral surface of said rotating grinding wheel (10). As can be seen, said nozzle (23), can be fed through a conduit or hose (13), or other embodiments are acceptable to provide an equivalent action. As a person skilled in the art will understand, any accessory element contributing to clean (keep clean) the grinding area may be incorporated, provided that it do not hinder obtaining the main objectives of the present invention.

Moreover, and as illustrated in particular for the second exemplary embodiment of the present invention in FIG. 6, it is possible to add a second inking roller train (25') in order to apply, for example, a second type of ink that is also not visible to the naked eye, but which is revealed to the incidence of a means of stimulating its appearance, such as for example, ultraviolet light, infrared light, polarized light, heat, so as to show other color or optical property perceptible for the duration of said stimulation. By way of preferred example, it could be possible to reveal a second color to the incidence of the revealing means, for example, ultraviolet light, causing that said second ink color to be different from the first ink color applied by the ink train (25), and different colors may be compatible with different tones of the engraved marking, that is, with different depths of abrasion. It is worth mentioning that it is possible to use a first inking roller train (25) for applying a first ink (7a) temporarily revealable under stimulation which manifests with a first color, and a second inking roller train (25') for the application of a second ink (7b) temporarily revealable under stimulation which manifests with a second color, being both inks (7a, 7b) applicable on the free face (31) of the simultaneously backing and printing die (30), and since the same can be revealed by the stimulation of the relevant stimulation means such as was detailed above. This has been illustrated by way of reference only for the understanding of a person skilled in this field of the art, and further comments and descriptions thereon are not necessary. In addition, based on the experience of use and types of paper to be used, different ink formulations can be used, even it is possible to add components to help improve its adherence, permanence, duration, and/or even to help retain the paper against the dies, among other options and examples of possible variations to be carried out by a person skilled in this field of art.

Even afterwards it is possible to incorporate one or more conventional printing rollers (26), to act after the security mark (1) has been produced, with its transmission and ink conditioning assembly, for example, whether they are inks, or varnishes, such as varnishes to fill the slight gravure printing obtained, and thus provide protection and/or additional strength to the paper, or the application of holograms, visible inks, invisible inks, numbers, etc. This has been illustrated by way of reference only for a person skilled in this field of the art, in order to clarify that there is no incompatibility in the device of the present invention to incorporate other components in order to incorporate this device in a more complex equipment or installation.

Method for Making a Security Mark on a Sheet Paper

As a person skilled in the field of the art can understand, the present method is closely linked with the device of the present invention, since the method is based on the simultaneous abrasion and printing of a substrate using a specially inked die and a grinding wheel for obtaining this special and advantageous security mark of multiple visual validation, and extremely accurate, i.e., absolute matching, which cannot be obtained by other means of positioning paper in a productive manner as proposed by the present invention.

Moreover, the inventors of the present have confirmed based on their experience, that the method and device proposed herein are closely linked so that their order of appearance may be interchanged without thereby affecting at all the result and actual object of protection defined. In fact, according to all what has been described and illustrated, there still is a close relationship with the product obtainable through the application of this method and for example, the document of value thus obtained, since the substrate is impregnated in a non-reproducible way by other techniques or procedures, it is not possible to obtain the same absolute, unequivocal, and unrepeatable match using other methods, since the same die performs both marking tasks (held to the light and revealable ink) that other die and/or even the same die in other circumstances could not reproduce, therefore, said product thus obtained is unique through this method and device; that is to say a document of value including said security mark defined by an engraved pre-designed image on the front of said document of value and absolutely matching marking and produced simultaneously on the back and by the same die a temporarily revealable ink mark by stimulation of a revealing means such as ultraviolet light, infrared light, polarized light, heat and/or the like.

In agreement with all the above, the method for producing a security mark on paper comprises the following steps:

a) mounting on said perimeter (16) of said supporting main rotary cylinder (15) at least one simultaneously backing and printing die (30) comprising the free face with the pre-designed image (31), b) inking the free face with the pre-designed image (31) of said at least one simultaneously backing and printing die (30) by means of at least one applicator roller (25a) of ink (7a) corresponding to the first inking roller train (25)

c) moving the sheet of paper (2) towards the main rotary cylinder (15), retaining said sheet of paper (2) resting on said at least one simultaneously backing and printing die (30) with its face already inked, wherein retaining the sheet of paper is obtained with said retention means (20, 21), and d) subjecting said sheet of paper to abrasion by the rotary grinding wheel (10) so that the distance of approach (g) causes wearing out of the obverse (3) of said paper (2) without passing through it, matching said pre-designed image, and simultaneously printing said pre-designed image (31) with said ink (7) on the reverse (4) of said sheet of paper (2).

Wherein in said step a) comprising the incorporation on said perimeter (16) of said supporting main rotary cylinder (15) at least one simultaneously backing and printing die (30), can be obtained either by mounting said simultaneously backing and printing die (30) directly on the cylinder in their housings, or directly incorporating the dies (30) into the cylinder by machining, engraving and/or by other techniques well known in the art, or preferably mounting a die plate (29), which already includes the dies (mounted and/or machined on said plate), it is clear that said simultaneous backing and printing dies (30) comprise their free face with the pre-designed image (31) intended to be applied to the substrate, sheet of paper, and/or the like. In addition, it is clear, according to what is described and illustrated above that said reference to the perimeter (16) of the main cylinder (15) is, for a person skilled in this field of art, the outer surface which may be physically touched, and can change its diameter depending on the plates, layers and/or coatings that could receive said cylinder during its assembly.

In said step b) the inking of the free face with the pre-designed image (31) of said at least one simultaneously backing and printing die (30) by means of at least one first applicator roller (25a) of ink (7) corresponding to the inking roller train (25), suitable for incorporating said ink (7) invisible to the naked eye, but revealable (visible) when subjected to an external stimulus, i.e., by the temporary stimulation of the qualities of the temporary appearance of the ink itself, which make it visible during the verification of authenticity of the security mark. For example, the external revealing stimulus can be ultraviolet light, infrared light, heat and polarized light among other options, whereby said ink may become luminous or visible in a variety of colors to choose from, one or more colors, depending on the multiple layers of application of ink (associated to the amount of inking applicator roller trains 25, 25', etc). It is clear to a person skilled in this field of art, and in view of the advances made in inks and application rollers, that other embodiments may be obtained, since there may be equivalent forms to emulate said inks and said rollers without this being sufficient to avoid falling within the scope of protection sought herein. In this regard it will also be understood that for practical purposes a fluorescent ink under ultraviolet light, allows easy verification by a person that is trying to verify the authenticity of the document or document of value; however, other combinations equivalent to the fluorescent ink under ultraviolet light may be included in this concept, for example, inks temporarily revealed by stimulation with heat, by the incidence of polarized light, and/or self revealable by a polarized filter, by incidence of light, infrared radiation and/or other means of stimulation, for the duration of said stimulation.

In said step c) when the sheet of paper (2) is transferred to the main rotary cylinder (15), said sheet of paper (2) is retained so that it rests on at least said one simultaneously backing and printing die (30) with its face already inked. In this step, and as mentioned above, the paper (2) is retained by the action of retention means (20) such as clamps and by retention means (21) such as suction nozzles, retaining the sheet of paper appropriately from their front (5) and back ends (6) and thus allowing to obtain a large area of free work, while other forms of specific retention can be put into practice.

In said step d) said sheet of paper is subjected to wear by the rotary grinding wheel (10), whether this rotary grinding wheel be single, multiple, and/or having a center (18) and an abrasive periphery (19) such that the distance of approach (g), which for practical purposes may be considered more specifically as interference distance (g) between paper (2)/grinding wheel (10) causes the wear of the front (3) of said paper (2) without passing through it and matching said pre-designed image. In this step it is essential the simultaneous application of the ink (7) with said pre-designed image (31), which as mentioned above is conveniently a temporarily revealable ink (7) under stimulation of some sort, such as ultraviolet light, infrared light, polarized light, heat, etc, directly applicable on the reverse (4) of said sheet of paper (2).

From all the above, and as a person skilled in the field of art can confirm, it is possible to obtain a sheet of paper with a plurality of certificates, official documents, documents of value, bonds, diplomas, passports, tickets, banknotes and the like. However, for the purposes of maximization of the qualities of this new security mark, after applying the same, it is possible to apply subsequent procedures to incorporate layers of visible ink, varnishes and/or the like, so as to finally obtain a document of value including a security mark (1), which has been incorporated into said document of value by means of the method described above, and based on the use of the device of the present invention, wherein said security mark is engraved on the front of said document of value and said security mark is printed with ink invisible to the naked eye, but which may be revealable by means of proper stimulation, such as preferably and conveniently the incidence of ultraviolet light on the back to obtain a colorful fluorescence, among other revealing options.

It is noteworthy that although preferred embodiments of the present invention have been described and illustrated based on specific terms, elements and forms, said descriptions and figures are only examples and should not be taken as limiting, unless otherwise expressly specified in writing. The words used are descriptive words rather than limiting words. It will be understood that those skilled in the field of the art, once armed with the benefits of what is herein described and illustrated, clearly may make variations, adaptations and mere formal but no substantive amendments, so it is understood that a variety of equivalent embodiments can be obtained from the point of view of the scope of protection of the present invention as it is defined in the attached claims.

What is claimed is:

1. A device for making security marks positionable on a sheet of paper comprising a main rotary cylinder for backing said sheet of paper, wherein said supporting main rotary cylinder includes retaining means of said sheet of paper, and a rotary grinding wheel adjacent to the perimeter of said supporting main rotary cylinder with a distance of approach adjustable regarding said supporting main rotary cylinder, wherein said device is characterized by further comprising:

at least one simultaneously backing and printing die comprising a free face with a pre-designed image, which is mounted on said perimeter of said main rotary cylinder, wherein said at least one simultaneously backing and printing die is suitable for backing said sheet of paper against said grinding wheel at the distance of approach sufficient to wear out the front of said paper without passing through it and matching said pre-designed image, and is suitable for printing simultaneously said pre-designed image with ink on the reverse of said sheet of paper, and at least one first inking roller train comprising at least one first applicator roller of said ink and that is positioned so as to make contact with said free face with said pre-designed image of the simultaneously backing and printing die.

2. The device of claim 1, characterized in that said at least one die comprises a plurality of dies which are mounted in a die plate, which in turn is mountable on said perimeter of said main rotary cylinder.

3. The device of claim 2, characterized in that said main rotary cylinder includes two of said die plates mounted diametrically opposed.

4. The device of claim 1, characterized in that said free face with a pre-designed image of said simultaneously backing and printing die has height differences in the free face itself between different points of the same, wherein said distance of approach is the distance between the perimeter of said grinding wheel and the point of lowest height of said free face and is lower than the thickness of said sheet of paper.

5. The device of claim 1, characterized in that said first applicator roller of said ink has an elastically yielding periphery.

6. The device of claim 1, characterized in that said at least one inking roller train comprises one first inking roller train for applying a first ink temporarily revealable by stimulation of a means of stimulation of temporary revealing with a first revealing color, and a second inking roller train for applying a second ink temporary revealable by stimulation of a temporary revealing means with a second revealing color, being both inks applied on the free face of the simultaneously backing and printing die.

7. The device of claim 1, characterized in that said grinding wheel comprises one cylindrical central body and one grinding belt mounted on said central body, being said grinding wheel comprised within one cabinet, wherein said cabinet has a lower opening with a comber brush and one pressing brush causing the lower closing of said cabinet against said main rotary cylinder, being in addition equipped inside said cabinet at least with one blower nozzle so as to direct the vent jet directly towards the peripheral surface of said rotary grinding wheel.

8. A method for making security marks positionable on a sheet of paper on a device comprising a main rotary cylinder for backing said sheet of paper, wherein said supporting main rotary cylinder includes retaining means of said sheet of paper, and a rotary grinding wheel adjacent to the perimeter of said supporting main rotary cylinder with a distance of approach adjustable regarding said supporting main rotary cylinder, wherein said method is characterized in that comprises the following steps:

a) mounting on the perimeter of said main rotary cylinder for supporting at least one simultaneously backing and printing die comprising a free face with the pre-designed image,
b) inking said free face with the pre-designed image of said at least one simultaneously backing and printing die by means of at least a first applicator roller of ink of a first inking roller train,
c) moving the sheet of paper to the main rotary cylinder, retaining said sheet of paper resting on said at least one simultaneously backing and printing die with its face already inked, wherein the sheet of paper is retained by said retention means, and
d) grinding said sheet of paper with a rotary grinding wheel so that the distance of approach causes wearing out of the front of said paper without passing through it and matching said pre-designed image, and simultaneously printing said pre-designed image with said ink on the reverse of said sheet of paper.

9. The method of claim 8, characterized in that said ink applied by said first inking roller train, comprising a first ink revealable by stimulation of a temporary revealing means with a first revealing color, and wherein said step b) further comprises inking said free face with the pre-designed image of said at least one simultaneously backing and printing die by means of at least one second applicator roller with one second ink revealable by stimulation of a temporary revealing stimulating means with a second revealing color of the second inking roller train.

* * * * *